United States Patent [19]

Nash

[11] Patent Number: 4,575,099

[45] Date of Patent: Mar. 11, 1986

[54] HIGH EXCURSION SEAL WITH FLEXIBLE MEMBRANE TO PREVENT GAS LEAKAGE THROUGH HINGE

[75] Inventor: Dudley O. Nash, Cincinnati, Ohio

[73] Assignee: General Electric Company, Cincinnati, Ohio

[21] Appl. No.: 574,317

[22] Filed: Jan. 27, 1984

[51] Int. Cl.[4] .......................... F16J 15/06; B64C 9/38
[52] U.S. Cl. ..................................... 277/12; 277/138; 239/265.37
[58] Field of Search ....................... 220/221, 222, 224; 277/12, 32, 138, 142, 148; 181/215, 216; 239/265.33, 265.35, 265.37, 265.43

[56] References Cited

U.S. PATENT DOCUMENTS

| | | | |
|---|---|---|---|
| 1,892,144 | 12/1932 | Griffin | 220/224 |
| 1,900,904 | 3/1933 | Berger | 220/224 X |
| 2,569,996 | 10/1951 | Kollsman | 239/265.43 X |
| 2,831,319 | 4/1958 | Geary | 60/35.6 |
| 2,928,238 | 3/1960 | Hawkins | 181/215 X |
| 3,354,649 | 11/1967 | Madden | 60/271 |
| 3,422,981 | 1/1969 | McBrien et al. | 220/224 |
| 3,892,358 | 7/1975 | Gisslen | 239/265.39 |
| 3,976,160 | 8/1976 | Hochs et al. | 181/215 |
| 4,212,472 | 7/1980 | Mizuno et al. | 277/12 |
| 4,308,968 | 1/1982 | Thiltgen et al. | 220/222 |

FOREIGN PATENT DOCUMENTS

| | | | |
|---|---|---|---|
| 466864 | 10/1928 | Fed. Rep. of Germany | 220/224 |
| 23327 | 2/1931 | Netherlands | 220/224 |
| 580995 | 9/1946 | United Kingdom | 181/215 |
| 1478976 | 7/1977 | United Kingdom | 220/224 |

Primary Examiner—Robert S. Ward
Attorney, Agent, or Firm—Douglas S. Foote; Derek P. Lawrence

[57] ABSTRACT

Means for reducing gas flow in the space between first and second relatively moveable members. The means include a support bracket which is attached to the first member and a seal plate which is hinged to the support bracket. One end of the seal plate is in slideable contact with the second member. The means also includes a flexible membrane which is fixedly attached to the support bracket of the seal plate to prevent leakage of gas through the hinge.

7 Claims, 3 Drawing Figures

U.S. Patent  Mar. 11, 1986  4,575,099
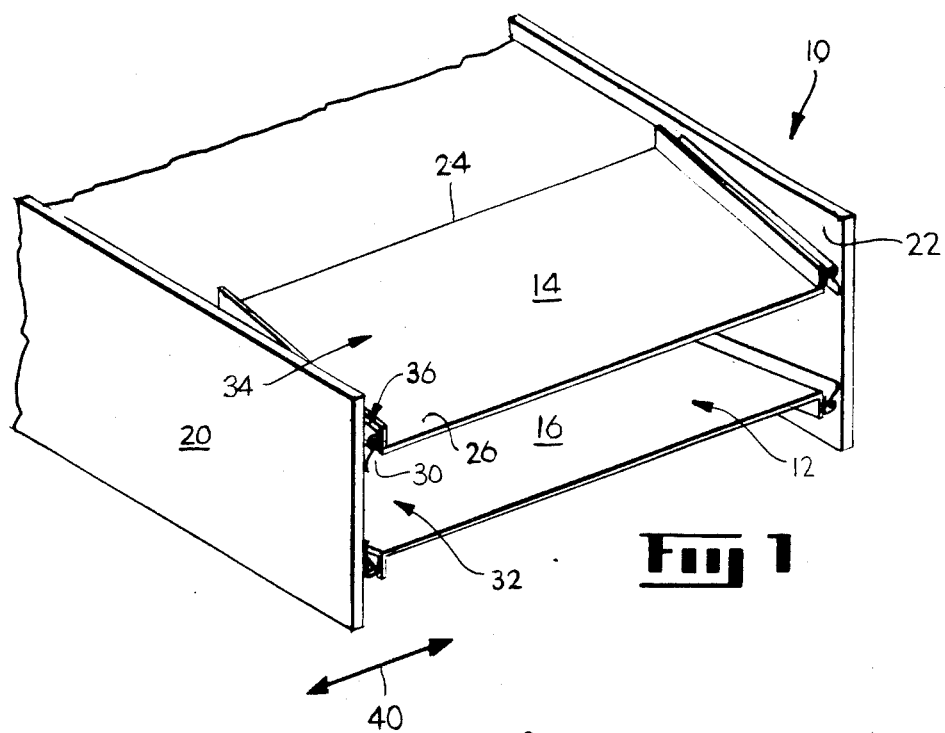
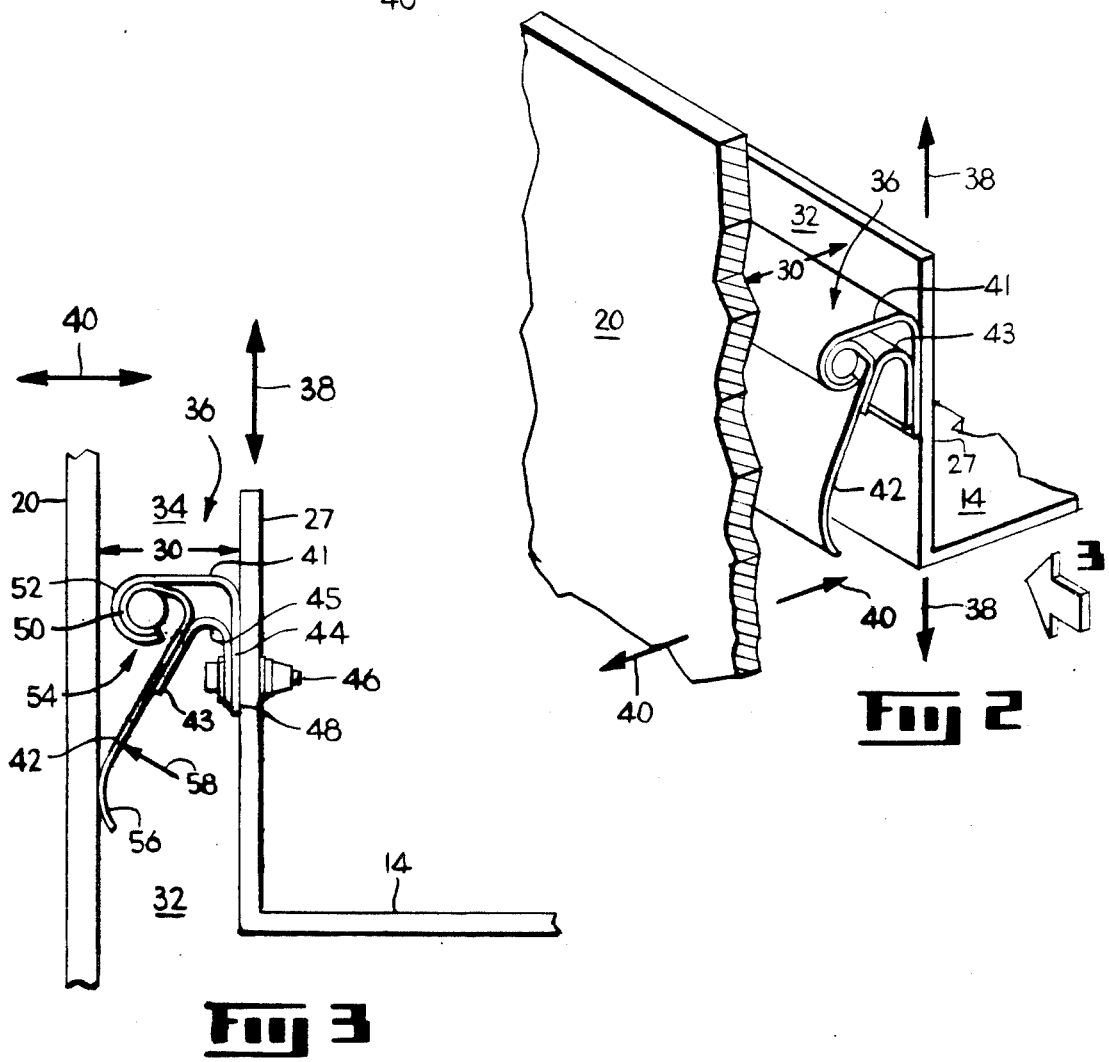

HIGH EXCURSION SEAL WITH FLEXIBLE MEMBRANE TO PREVENT GAS LEAKAGE THROUGH HINGE

This invention relates generally to seals for use between two relatively moveable members. More particularly, it relates to exhaust nozzle seals for use in aircraft gas turbine engines.

BACKGROUND OF THE INVENTION

In high performance jet turbine engines for aircraft, it is frequently desirable to provide a variable area exhaust nozzle to improve engine performance. For example, two dimensional (2D) nozzles employ two generally stationary side walls and upper and lower flaps which define the boundaries of the exhaust opening. By appropriate actuation means, the upper and lower flaps may be opened or closed to change the area of the exhaust opening. In so moving, the upper and lower flaps slide relative to the side walls.

Space between the moveable flaps and the stationary side walls provides a leakage path for relatively high pressure gases in the main exhaust flow stream. A major concern in the design of such exhaust systems, therefore, is the control of leakage through such space or gap.

Two types of exhaust seals that have been used in the past are elastic leaf seals and hinge leaf seals. Elastic leaf seals consist of a generally "U" shaped member which is fastened on one side to one of the members to be sealed and is in rubbing contact on its other side to the other member. This seal may be spring loaded so that as the two members move apart it maintains contact therebetween. As with other seals, two basic requirements must be satisfied. Namely, it must be strong enough to withstand the relatively high pressure of the exhaust flow stream, and it must, at the same time, be flexible enough to expand and contract with variations in the gap. In general, elastic leaf seals are unable to satisfy these requirements. That is, if they are strong enough to stand the pressure, they may not be flexible enough to accomodate the required expansion.

Hinge leaf seals generally include two flat sheets which pivot from a common hinge point. One of the sheets is attached to one of the members to be sealed and the other sheet is in rubbing contact with the other member. Such seals satisfy the requirements of high strength and ability to expand and contract as the gap opens and closes. However, a problem which exists in such seals is that a leakage path for high pressure gases exists through the hinge. In spite of careful design, the performance penalty in current nozzles is in the range of 0.6% to 0.9% in flow and thrust.

OBJECTS OF THE INVENTION

It is an object of the present invention to provide a new and improved seal for reducing the flow of gas in the space between two relatively moveable members.

It is another object of the present invention to provide a light weight, high excursion seal for exhaust systems with reduced losses over seals heretofore known.

SUMMARY OF THE INVENTION

In accordance with the present invention, means for reducing gas flow in the space between first and second relatively moveable members is disclosed. The means comprise a support bracket, a seal plate, and a flexible membrane. The support bracket is attached to the first member. The seal plate has first and second opposite ends with the first end hinged to the support bracket and the second end in slideable contact with the second member. The flexible membrane is fixedly attached to the support bracket and the seal plate.

BRIEF DESCRIPTION OF THE DRAWINGS

FIG. 1 is a fragmentary rear perspective view of an exhaust nozzle incorporating features of the present invention.

FIG. 2 is a fragmentary perspective view of a seal according to the present invention.

FIG. 3 is a cross section of the seal shown in FIG. 2 as viewed from arrow 3.

DETAILED DESCRIPTION OF THE INVENTION

FIG. 1 shows a two-dimensional exhaust nozzle 10 such as might be used on an aircraft gas turbine engine. Exhaust nozzle 10 provides an opening 12 for discharging engine exhaust gases to the atmosphere. Exhaust opening 12 is defined by moveable upper flap 14, moveable lower flap 16, and side plates 20 and 22. Upper flap 14 and lower flap 16 are each generally normal to side plates 20 and 22. As flap 14 pivots about hinge line 24, side edge 26 of flap 14 is in sliding contact with side plate 20.

Due to the high pressures and temperatures in the exhaust opening 12, side plates 20 and 22 do not remain perfectly rigid. Rather, plates 20 and 22 may have a tendency to move laterally along line 40. In so doing, a variable gap 30 between the side edge 26 of moveable flap 14 and side plate 20 is created. As a result, gas in the relatively high pressure region 32 or opening 12 has a tendency to leak into the relatively low pressure region 34 on the outer side of flap 14. In order to reduce the gas flow in the space or gap 30 between side edge 26 and side plate 20, seal 36 is provided. It should be noted that a similar seal may be provided at each side edge of upper and lower flaps 14 and 16 where in sliding contact with side plates 20 or 22.

FIGS. 2 and 3 show seal 36 in more detail. It should be understood that although the seal according to the present invention will be described for application in an exhaust nozzle it applies equally to seals for reducing gas flow in the space between any two relatively moveable members. In general, upper flap or first member 14 is relatively moveable with respect to side plate or second member 20. This relative motion may consist of sliding motion shown by arrows 38 and lateral motion shown by arrows 40. Seal 36 in the gap or space 30 between members 26 and 20 is adapted to reduce the flow of gas from relatively high pressure region 32 to relatively low pressure region 34.

Seal 36 comprises a support bracket 41, a seal plate 42, and a flexible membrane 43. Support bracket 41 and seal plate 42 form a hinge leaf seal. A first end 44 of support bracket 41 is attached to flange 27 of first member 14. Any appropriate fastening means may be employed to attach end 44 to member 26. However, it has been found that a plurality of bolts 46 together with a continuous edge weld 48 securely fastens support bracket 41 to member 26 and also reduces gas leakage between these members to substantially zero. Further, such an arrangement allows for relatively simple installation and replacement.

Seal plate 42 has a first end 50 which is pivotally connected to the second end 52 of support bracket 41 by hinge means 54. In the embodiment shown in FIGS. 2 and 3, hinge means 54 includes first end 50 of seal plate 42 having a cylindrical shape and second end 52 of bracket 41 having a cylindrical shape so that ends 50 and 52 are concentrically mated in pivotal contact. It is within the scope of the present invention to include other hinge means as well. For example, a pinned hinge may be advantageously employed.

The second end 56 of seal plate 52 is in slideable contact with second member 20. During periods of operation, relatively high pressure air in region 32 pushes on seal plate 42 in the direction shown by arrow 58. Such a force provides biasing means to urge plate 42 into contact with member 20 to hold second end 56 in close contact with member 20 thereby reducing the gas leakage therebetween.

Support bracket 41 together with seal plate 42 partially reduce the gas flow between high pressure region 32 and low pressure region 34. However, irrespective of the type of hinge means 54 that is employed, a leakage path through the hinge means exists. In order to reduce the flow of gas through hinge means 54, flexible membrane 43 is fixedly attached to support bracket 41 and seal plate 42.

In a preferred embodiment, flexible membrane 43 has a generally "U" shape so that its concave surface 45 faces the high pressure region 32. Membrane 43 should be attached to bracket 41 and plate 42, respectively, by fastening means so that substantially no gas flows through hinge means 54. In a preferred embodiment, a seam weld may be used.

Flexible membrane 43 opens and closes with seal plate 42 but, being located near hinge means 54, membrane 43 does not have to open as far as seal plate 42. In addition, by facing concave surface 45 toward high pressure region 32, the curved portion of the membrane is loaded in hoop tension. Thus, it may be made from a high strength, yet relatively thin, material. For example, a nickel based alloy such as Rene' 41 or Inconel 718 may be advantageously employed.

In operation, flexible membrane 43 provides an initial biasing force to urge seal plate 42 into contact with second member 20. As high pressure builds in region 32, the pressure provides an additional biasing force 58 on flexible membrane 43 to keep plate 42 in contact with member 20. Seal plate 42 is thus able to provide reliable sealing over a relatively wide separation of members 14 and 20. By positioning flexible membrane 43 near hinge means 54, the degree of deflection of membrane 43 may be minimized.

It may be desirable to extend flexible membrane 43 beyond first end 44 of bracket 41 and provide a seam weld at that point. In this manner, a single weld will prevent leakage between member 26 and membrane 43. It will also obviate the need for edge weld 48 on first end 44 of support bracket 41.

It will be clear to those skilled in the art that the present invention is not limited to the specific embodiments described and illustrated herein. Nor is the invention limited to a seal for flat wall exhaust systems. Rather, the invention applies equally to sealing means for reducing the flow of gas between any two relatively moveable members.

It will be understood that the dimensions and proportional and structural relationships shown in the drawings are illustrated by way of example only and those illustrations are not to be taken as the actual dimensions or proportional structural relationships used in the seal of the present invention.

Numerous modifications, variations, and full and partial equivalents can be undertaken without departing from the invention as limited only by the spirit and scope of the appended claims.

What is desired to be secured by Letters Patent of the United States is the following.

What is claimed is:

1. Means for reducing gas flow in the space between first and second relatively moveable members comprising:
   a support bracket attached to said first member;
   a seal plate with first and second opposite ends, said first end being hinged to said support bracket and said second end being in slideable contact with said second member; and
   a flexible membrane fixedly attached to said support bracket and said seal plate.

2. In the space between two relatively moveable members, a seal for reducing the flow of gas from a relatively high pressure region to a relatively low pressure region comprising:
   a support bracket with first and second ends, said first end being attached to said first member;
   a seal plate with first and second opposite ends, said first end being connected to said second end of said support bracket by hinge means, and said second end being in slideable contact with said second member;
   wherein said gas in said high pressure region provides biasing means to urge said plate into contact with said second member; and
   a flexible membrane fixedly attached to said support bracket and said seal plate, wherein said membrane reduces the flow of gas through said hinge means.

3. A seal, as recited in claim 2, wherein said flexible membrane has a generally "U" shape with a concave surface so that said concave surface faces said relatively high pressure region.

4. A seal, as recited in claim 2, wherein said flexible membrane is attached to said bracket and plate, respectively, by fastening means so that substantially no gas flows through said hinge means.

5. A seal, as recited in claim 2, wherein said hinge means includes:
   said first end of said plate having a first cylindrical shape; and
   said second end of said bracket having a second cylindrical shape;
   wherein said ends are concentrically mated in pivotal contact.

6. In the space between two relatively moveable members, a seal for reducing the flow of gas therebetween comprising:
   a support bracket with first and second ends, said first end being attached to said first member;
   a seal plate with first and second opposite ends, said first end being connected to said second end of said support bracket by hinge means, and said second end being in slideable contact with said second member; and
   a flexible membrane fixedly attached to said support bracket and said seal plate;
   wherein said membrane provides biasing means to urge said plate into contact with said second member and said membrane reduces the flow of gas through said hinge means.

7. In the space between two generally normal and relatively moveable members, a seal for reducing the flow of gas from a first region at a pressure to a second region at a lower pressure comprising:
- a support bracket with first and second ends, said first end being attached to said first member;
- a seal plate with first and second opposite ends, said first end being connected to said second end of said support bracket by hinge means, and said second end being in slideable contact with said second member; and
- a generally "U" shaped flexible membrane with a concave surface, said membrane being fixedly attached to said support bracket and said seal plate so that said concave surface faces said first region;
- wherein said membrane provides biasing means to urge said plate into contact with said second member and said membrane reduces the flow of gas through said hinge means.

* * * * *